United States Patent
Busi et al.

(10) Patent No.: US 10,042,638 B2
(45) Date of Patent: Aug. 7, 2018

(54) EVALUATING DOCUMENTATION COVERAGE

(71) Applicant: HEWLETT PACKARD ENTERPRISE DEVELOPMENT LP, Houston, TX (US)

(72) Inventors: Eliraz Busi, Yehud (IL); Oren Gurfinkel, Yehud (IL); Doron Levi, Modiin (IL)

(73) Assignee: ENTIT SOFTWARE LLC, Sanford, NC (US)

( * ) Notice: Subject to any disclaimer, the term of this patent is extended or adjusted under 35 U.S.C. 154(b) by 0 days.

(21) Appl. No.: 15/515,699

(22) PCT Filed: Sep. 30, 2014

(86) PCT No.: PCT/US2014/058301
§ 371 (c)(1),
(2) Date: Mar. 30, 2017

(87) PCT Pub. No.: WO2016/053298
PCT Pub. Date: Apr. 7, 2016

(65) Prior Publication Data
US 2017/0308379 A1    Oct. 26, 2017

(51) Int. Cl.
*G06F 8/73*  (2018.01)
*G06F 8/77*  (2018.01)

(52) U.S. Cl.
CPC . *G06F 8/73* (2013.01); *G06F 8/77* (2013.01)

(58) Field of Classification Search
None
See application file for complete search history.

(56) References Cited

U.S. PATENT DOCUMENTS

| | | | |
|---|---|---|---|
| 7,458,063 B2* | 11/2008 | Pandit | G06F 8/73 717/123 |
| 8,307,292 B2 | 11/2012 | Marcos et al. | |
| 8,924,934 B2* | 12/2014 | Sullivan | G06F 11/3664 715/716 |

(Continued)

FOREIGN PATENT DOCUMENTS

CN    103279413 A    9/2013

OTHER PUBLICATIONS

International Search Report & Written Opinion received in PCT Application No. PCT/US2014/058301, dated May 28, 2015, 10 pages.

(Continued)

*Primary Examiner* — Chat Do
*Assistant Examiner* — Douglas Slachta

(57) ABSTRACT

Evaluating documentation coverage can include identifying, from a testing tool having exercised an application, interface elements of the application's user interface. The identified interface elements are filtered to identify documentable interface objects. For each identified documentable interface object, it is determined if documentation exists for that documentable interface object. A value, indicative of the determined existence or non-existence of documentation, is assigned to each documentable interface object. Documentation coverage data is reported for the application interface. The coverage data is reflective of the values assigned to the documentable interface objects.

14 Claims, 3 Drawing Sheets

(56) References Cited

U.S. PATENT DOCUMENTS

| | | | |
|---|---|---|---|
| 2003/0058266 A1* | 3/2003 | Dunlap | G03G 15/5016 715/705 |
| 2004/0123239 A1 | 6/2004 | Roessler | |
| 2007/0156643 A1 | 7/2007 | Sareen et al. | |
| 2008/0282198 A1* | 11/2008 | Brooks | G06F 3/048 715/854 |
| 2009/0187824 A1* | 7/2009 | Hinckley | G06F 9/453 715/711 |
| 2010/1031874 | 12/2010 | Fitzpatrick et al. | |
| 2011/0055676 A1 | 3/2011 | Sun et al. | |
| 2011/0271185 A1 | 11/2011 | Chen et al. | |
| 2011/0307865 A1 | 12/2011 | Grieves et al. | |
| 2011/0314415 A1* | 12/2011 | Fitzmaurice | G06F 3/0481 715/808 |
| 2012/0102458 A1* | 4/2012 | Meijer | G06F 8/73 717/123 |
| 2013/0024763 A1 | 1/2013 | Nemati et al. | |
| 2013/0111329 A1* | 5/2013 | Jaganathan | G06F 9/453 715/239 |
| 2013/0318503 A1* | 11/2013 | Li | G06F 9/45529 717/126 |
| 2013/0332905 A1* | 12/2013 | Vikutan | G06F 11/3684 717/124 |
| 2014/0019937 A1 | 1/2014 | Clark et al. | |
| 2014/0047413 A1* | 2/2014 | Sheive | H04L 65/403 717/110 |
| 2014/0075304 A1* | 3/2014 | Bailey | G06F 9/453 715/705 |
| 2014/0215323 A1* | 7/2014 | Nelson | G06F 17/24 715/256 |

OTHER PUBLICATIONS

McCabe Software, "Improved Software Testing Using McCabe IQ Coverage Analysis," (Research Paper), Mar. 3, 2006, 11 pages, available at http://www.mccabe.com/pdf/Improved%20Te.

EPO Search Report, 14903036.3-1224 / 3201790, PCT/US2014/058301, dated Apr. 26, 2018, 10 pages.

* cited by examiner

EVALUATING DOCUMENTATION COVERAGE

BACKGROUND

Users often rely on documentation to understand and better utilize various features of software applications. Documentation can take a number of forms such as tool tips that appear when the user interacts with a control of a user interface. Other documentation examples can include a knowledge base or a dedicated application help feature. Software applications are often updated to change or add new functionality. Thus, as an application develops over time, it can be important to ensure that its documentation is also updated to reflect changes as they occur.

DRAWINGS

DETAILED DESCRIPTION

Introduction

As the development lifecycle of applications accelerate with features being added or updated at ever increasing rates, documentation for those features is often out of date or non-existent. This documentation gap or lag can occur when the synchronization between code and documentation updates is based on human interactions and there is no real governance on the quality and quantity of the exchanged information. As a result, users of a recently updated software application are left, at least temporarily, without access to accurate documentation for new or updated features.

Various embodiments described below operate to automatically detect non-documented functionality through automatic system tests. Armed with the knowledge of which features are and which features are not properly documented, the development team is able to better manage and synchronize documentation updates with the code changes.

In an example, a software testing tool capable of testing user interface functionality scans an application's user interface to identify its elements. As used herein, interface elements are the data that define the user interface. The elements identify and define interface objects such as interface controls, titles, headers, captions, and tooltips. The output of the scan can be used to populate an object repository that helps the testing tool understand the structure and components of the application's user interface. The testing tool then utilizes the object repository when executing test scripts on the application. Embodiments described herein utilize the output of that scan to help determine if particular interface objects are documented.

Figure 1:
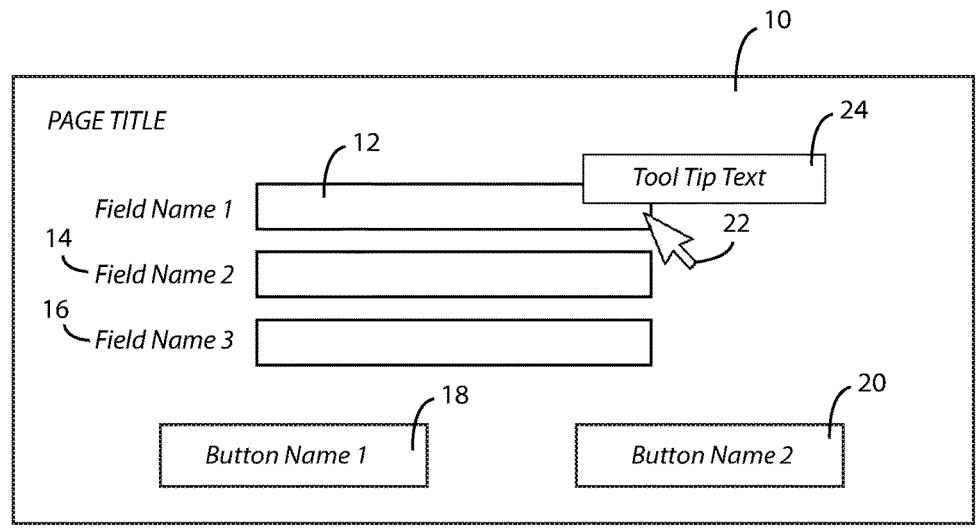
FIG. 1 depicts an example user interface.
Figure 2:
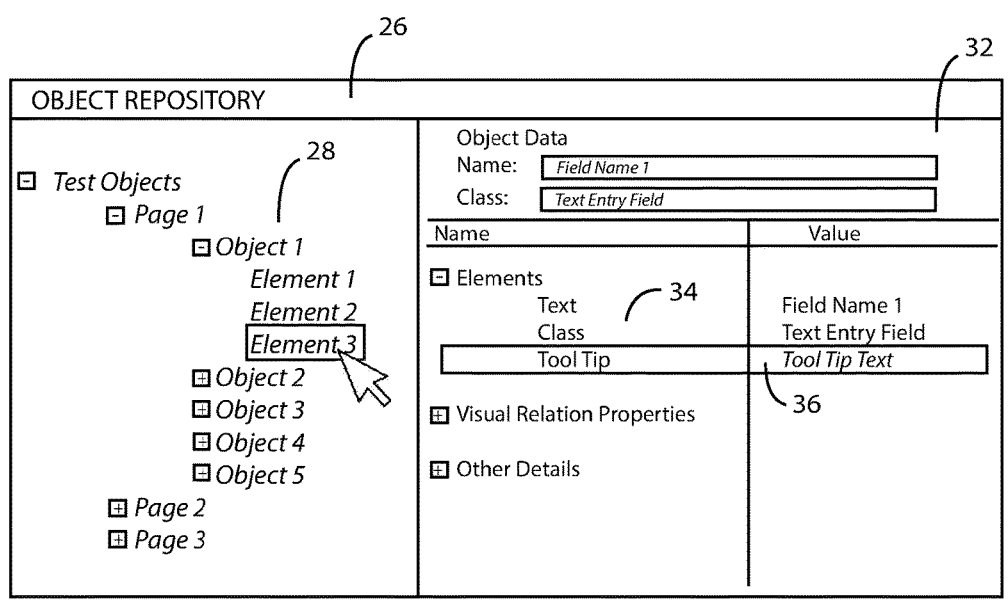
FIG. 2 depicts an example object repository tool displaying user interface data.

FIGS. 1 and 2 provide an illustrative example. FIG. 1 depicts an example page of an application's user interface. FIG. 2 depicts a screen view of an object repository tool showing information extracted during a scan of the user interface. Starting with FIG. 1, interface page 10 includes objects 12-20. Objects 12-16 are shown as text fields and objects 18-20 are shown as buttons. In this example, a user has placed a mouse pointer 22 over object 12 causing the application to display tool tip 24. Tool tip 24 can be said to document interface object 12.

Moving to FIG. 2, a tool for testing user interface functionality has interacted with the application and scanned its interface to glean details of its various elements. Screen view 26 of the object repository tool shows a hierarchical data tree 28 for the structure for the scanned interface. In this example, the scan identified three pages, the first page being interface page 10 depicted in FIG. 1. With Page 1 expanded in tree 28, five interface objects are listed each representing one of objects 12-20 of FIG. 1. Each object can be defined by a number of elements. In the example of FIG. 2, object one is expanded to list three elements with element 3 being highlighted. As a result, object data 32 for object one is displayed. Object data 32 represents those interface elements that define and are thus associated with a particular object. In this case, the object data includes elements 34 that define the selected object. In particular, selected element 3 corresponds to the tool tip for object 12 of FIG. 1.

By processing the object repository, associations between interface objects and elements indicative of documentation can be ascertained. In the example of FIGS. 1 and 2, such elements are depicted as tooltips. It is noted, however, that other interface elements may also be indicative of tool tips. Moreover, rather than relying on the existence of an object repository, another electronic representation of the user interface may be scanned to obtain the data. An examples include a scanning the mark-up language file defining a web page or a document object model for that page. Another example includes utilizing WinForms for a Windows® based application.

Using the process above, it can be determined, for each interface object, whether that object is associated with an interface element indicative of documentation. When no such association can be found, it can be presumed that a given interface object needs to be documented. A report can then be generated identifying documentation coverage for the application. That report can specifically call out the interface objects lacking documentation.

Components

Figure 3:
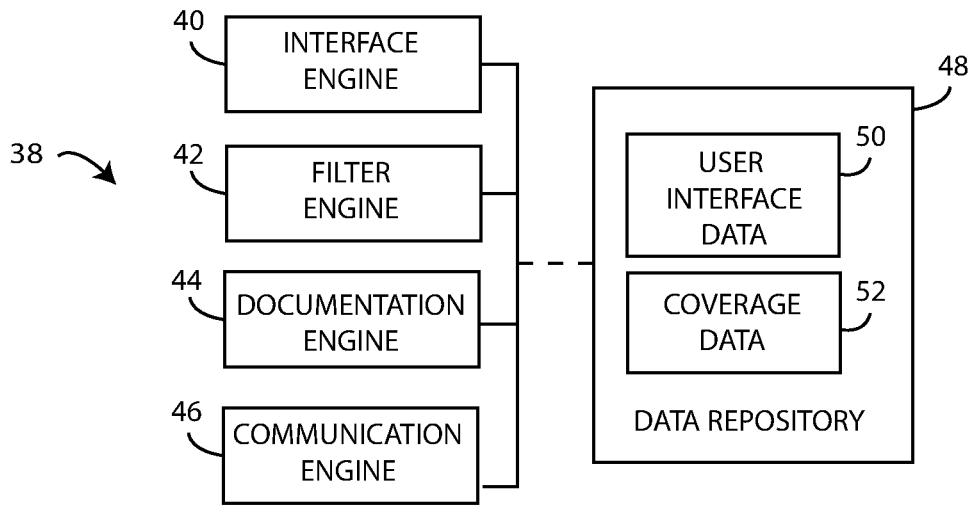
FIG. 3 is a block diagram depicting an example of a system for identifying a common user flow.

FIG. 3 depicts an example of a system 38 for evaluating document coverage. In FIG. 3 various components are identified as engines 40-46. In describing engines 40-46, focus is on each engine's designated function. However, the term engine, as used herein, refers to a combination of hardware and programming configured to perform a designated function. As is illustrated later with respect to FIG. 4, the hardware of each engine, for example, may include one or both of a processor and a memory device, while the programming is code stored on that memory device and executable by the processor to perform the designated function.

As depicted in FIG. 3, system 38 includes interface engine 40, filter engine 42, documentation engine 44, and communication engine 46. In performing their respective functions, engines 40-46 may access data repository 48. Repository 48 represents generally any data storage resource accessible to system 38 that can be used to store and retrieve data.

Interface engine 40 is configured to extract, from an application's user interface data 50, element data identifying interface elements. User interface data 50 is data that, at least partially, defines or otherwise describes the application's user interface. Examples of user interface data 50 include object repository data for the application, a markup language file or files, a document object model and any other data configured to be processed to cause a display or description of a user interface. User interface elements serve to describe and thus identify user interface objects. Interface objects are the visual components of a user interface. Some interface objects such as buttons, text boxes, pull down menus, and links allow users to interact with and realize various application functions. A user interface object can be defined by any number of elements. In addition to identifying a particular interface object, those elements can specify characteristics such as size and placement of the object, the object's contents, any associated hyperlinks, and a tooltip that is to appear based on user interaction with the particular interface object.

Interface engine 40 may perform its function based on a technology type of the application. Technology type, as used herein, refers to the underlying format and protocols used by the application as well as the platform on which the application executes. Examples include varying types of web based services and desktop applications. Thus, interface engine 40 my first identify a technology type of the application. Based on the identified technology type, interface engine 40 then selects one of a plurality of available techniques to extract element data 50. With a web application, one technique may include processing a mark-up language representation of the application's interface. Another technique can include scanning the applications interface to identify the elements while also mimicking documentation access requests with respect to those elements and processing responses. A document access request is an interaction between a user and an application's interface designed to access documentation. When scanning a desktop application, for example, interface engine 40 may mimic an F1 key press or other interaction with respect to an identified interface element and process a response, if any; to identify an additional interface elements. If present, such an additional interface element may be deemed associated with the identified interface element and indicative of documentation.

As noted, an applications interface data 50 may take the form of object repository data. In such a case, interface engine 40 may coordinate with a software testing tool responsible for maintaining the data for the object repository. Stated another way, interface engine 40 may identify interface elements of an applications user interface from a testing tool that has or is exercising that application. A testing tool can exercise an application in a number of fashions such as by scanning or crawling its user interface and executing test cases against the user interface. Exercising, here, can include mimicking document access requests. As result of exercising the application, the testing tool may populate an object repository with element data for that application.

Filter engine 42 is configured to parse the element data to identify object data. Object data is information identifying the documentable interface objects for an application. A documentable interface object is an interface object for which it is to be ascertained whether documentation exists. To explain, certain types of interface objects benefit more from documentation than others. For example an interface object such as a page title is often descriptive on its own while a button or a pull down menu can often benefit from documentation that describes its function. Filter engine 42 serves to identify those interface objects that are to be documented. In doing so, filter engine 42 may utilize a user specified rule set that identifies interface object types that are to be evaluated for documentation coverage. Such a rule set may specify types of interface objects with which a user may interact or a particular subset of such object types. Again, such interface object types can include radio buttons, hyperlinks, pull down menus, command buttons, and any other interface control through which a user can interact with an application. An interface object type may be even more coarsely defined to include a window.

Documentation engine 44 is configured to process the element data extracted by interface engine 40 and the object data identified by filter engine 42 to ascertain associations between the documentable interface objects and any interface elements that are indicative of documentation. In other words, documentation engine 44 is configured to identify interface elements that indicate that a particular interface object or objects have been documented.

The element data extracted by interface engine 40 may be organized in a hierarchical format such that sets of interface elements that describe different interface objects are grouped or clustered together under different nodes. In an example, an interface element under a given node that describes or otherwise defines a tool tip may be considered by documentation engine 44 as an interface element that is indicative of documentation for an interface object associated with that node. In another example, documentation engine 44 may been an interface element identified as a result of mimicking a document access request with respect to a particular documentable object to be associated documentation for that documentable object.

Communication engine 46 is configured to report coverage data 52 representative of associations ascertained by document engine 44. Reporting can take a number of forms including electronically communicating the coverage data to a specified destination or address. Reporting can include electronically storing the coverage data in a format that can be retrieved and processed.

In performing their functions, documentation engine 44 may distinguish those of the documentable interface objects it has ascertained to be associated with an interface element indicative of documentation. For example, documentation engine 44 may add a flag to the object data for each documentable interface object having an ascertained association. Communication engine 46 may then assign a value to each of the documentable interface objects with each assigned value reflecting whether that documentable interface object has been distinguished by documentation engine 44. Communication engine 46 can then report coverage data 52 that is indicative of the values assigned to the documentable interface objects. The coverage data 52, for example, may reflect a percentage of the documentable interface objects having been distinguished and thus presumed to be documented. The coverage data 52 may also identify specific documentable interface objects that have and have not been distinguished.

As noted above, the element data extracted by interface engine 40 can be organized in a hierarchical format with parent and child elements. Higher level parent elements can identify different interface pages with the child elements associated with each such parent defining the page's interface objects. The term page as used herein refers to a visually bounded collection of interface objects that are displayed together independently of other interface pages. Communication engine 46 may, for each such parent interface element, report coverage data 52 that is reflective of the values assigned to the documentable interface objects that are children of that parent interface element. In doing so the coverage data 52 for a given interface page can be identified and tracked over time.

In the foregoing discussion, engines 40-46 were described as combinations of hardware and programming. Engines 40-46 may be implemented in a number of fashions. Looking at FIG. 4, the programming may be processor executable instructions stored on tangible memory resource 54 and the hardware may include processing resource 56 for executing those instructions. Thus memory resource 54 can be said to store program instructions that when executed by processing resource 56 implements system 38 of FIG. 3.

Memory resource 54 represents generally any number of memory components capable of storing instructions that can be executed by processing resource 56. Memory resource 54 is non-transitory in the sense that it does not encompass a transitory signal but instead is made up of one or more memory components configured to store the relevant instructions. Memory resource 548 may be implemented in a single device or distributed across devices. Likewise, processing resource 56 represents any number of processors capable of executing instructions stored by memory resource 54. Processing resource 58 may be integrated in a single device or distributed across devices. Further, memory resource 54 may be fully or partially integrated in the same device as processing resource 56, or it may be separate but accessible to that device and processing resource 56.

In one example, the program instructions can be part of an installation package that when installed can be executed by processing resource 56 to implement system 38. In this case, memory resource 54 may be a portable medium such as a CD, DVD, or flash drive or a memory maintained by a server from which the installation package can be downloaded and installed. In another example, the program instructions may be part of an application or applications already installed. Here, memory resource 54 can include integrated memory such as a hard drive, solid state drive, or the like.

Figure 4:
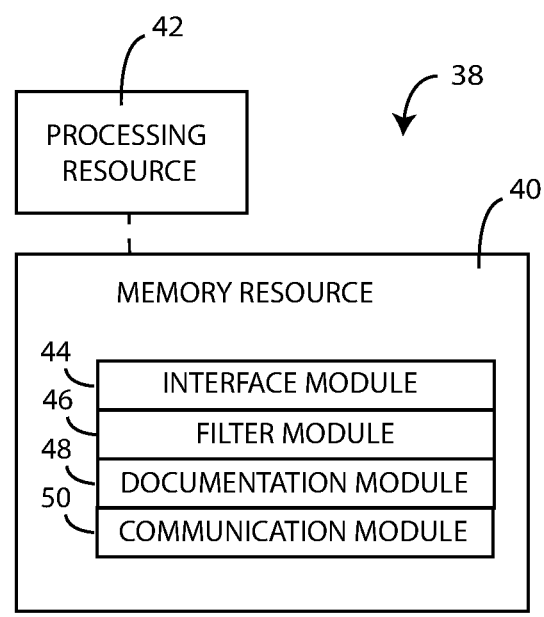
FIG. 4 is a block diagram depicting a memory resource and a processing resource according to an example.

In FIG. 4, the executable program instructions stored in memory resource 54 are depicted as interface, filter, documentation, and communication modules 58-64 respectively. Interface module 58 and filter module 60 represent program instructions that, when executed, cause processing resource 56 to implement interface engine 40 and filter engine 42 respectively. Likewise, documentation module 62 and communication module 64 represent program instructions that when executed cause the implementation of documentation engine 44 and communication engine 46 respectively.

Operation

Figure 5:
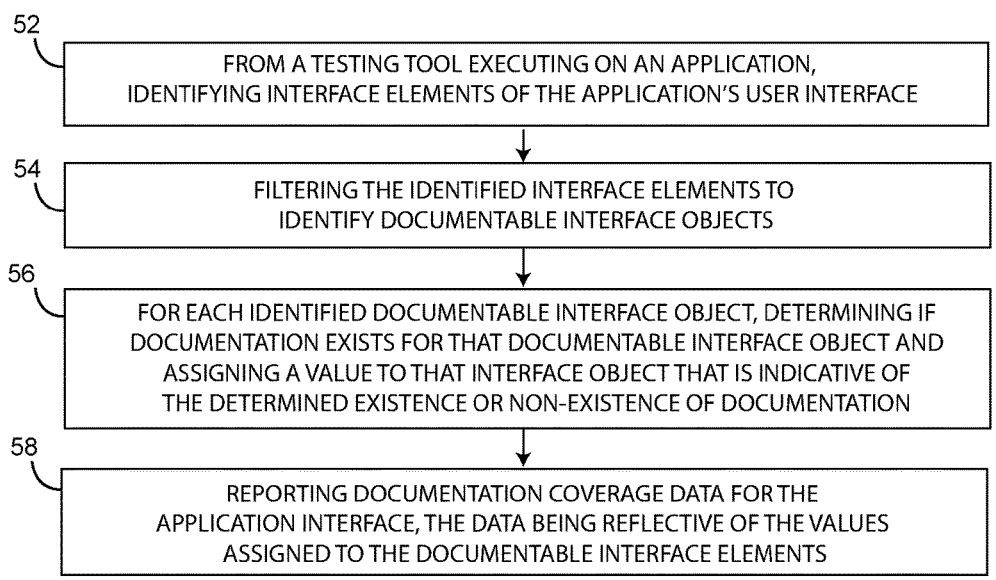
FIG. 5 is a flow diagram depicting actions taken to implement an example.

FIG. 5 is a flow diagram of actions taken to implement a method for evaluating documentation coverage. In discussing FIG. 5, reference may be made to components depicted in FIGS. 1-4. Such reference is made to provide contextual examples and not to limit the manner in which the method depicted by FIG. 5 may be implemented.

From a testing tool having exercised an application, interface elements of the application's user interface are identified (block 66). Block 66 may be accomplished, for example, by accessing an object repository or other data store maintained for the testing tool and processing user interface data collected or assembled for the application. Block 66 may be accomplished by receiving from the testing tool, a communication identifying the interface elements. Referring back to FIG. 3, interface engine 40 may be responsible for implementing block 66.

The identified interface elements are filtered to identify documentable interface objects (block 68). In block 68 element data representative of the interface elements identified in block 66 may be parsed to identify object data representative of user interface objects of the application. That object data may then be further filtered to identifying the applications documentable interface objects. Such may be accomplished by applying a user specified rule set that identifies interface object types that are to be evaluated for documentation coverage. Such a rule set may specify types of interface objects with which a user may interact or a particular subset of such object types. Again, such interface object types can include radio buttons, hyperlinks, pull down menus, command buttons, and any other interface control through which a user can interact with an application. Referring back to FIG. 2, filter engine 42 may be responsible for implementing block 68.

For each identified documentable interface object, it is determined if documentation exists for that documentable interface object and a corresponding value is assigned to that documentable interface object (block 70). For each documentable interface object, block 70 may then include ascertaining if that documentable interface object is associated with an identified interface element that is indicative of documentation. In other words, documentation existence is then determined according to whether an association is ascertained. Such interface elements may define or otherwise indicate the presence of a tooltip for a corresponding interface object. Also, each value assigned to a documentable interface object is indicative of the determined existence or non-existence of documentation for that object. For example a value of one may be assigned to a documentable interface object for which documentation is determined to exist. A value of zero may indicate a lack of documentation.

Determining, in block 70, can include ascertaining whether the existence of documentation can be determined from user interface data that at least partially defines the application's user interface as a collection of interface elements. If the documentation existence can be determined from the user interface data, block 70 can include processing the user interface data to identify associations between the documentable interface objects and those of the interface elements that are indicative of documentation. If documentation existence cannot be determined in that fashion, block 70 can include; mimicking a number of documentation access requests and processing responses to determine the existence of documentation for the documentable interface objects.

The method depicted in FIG. 5 can also include identifying a technology type of the application. Determining at block 70 can then include, for each identified documentable interface object, determining if documentation exists for that documentable interface object utilizing a technique from a plurality of techniques selected based on the identified technology type. Such techniques can include exercising the application's interface, mimicking document access requests, and processing responses. The particular method for mimicking a document access request can be selected based upon the identify technology type.

Documentation coverage data is reported for the for the application interface (block 72). The documentation coverage data is reflective of the values assigned to the documentable interface objects. The coverage data, for example, may reflect a percentage of the documentable interface objects having been distinguished and thus presumed to be documented. The coverage data may also identify specific documentable interface objects that have and have not been distinguished. Communication engine 46 of FIG. 2 may be responsible for block 72.

Block 66 may include identifying a hierarchical representation of the identified interface elements. Such representation will include parent and child elements. Higher level parent elements can identify different interface pages ore segments with the child elements associated with each such parent defining the page's or segment's interface objects. Block 72 may then include reporting, for each such parent interface element, coverage data that is reflective of the values assigned to the documentable interface objects that are children of that parent interface element. In doing so the coverage data for a given interface page can be identified and tracked over time.

CONCLUSION

FIGS. 1-4 aid in depicting the architecture, functionality, and operation of various embodiments. In particular, FIGS. 1-4 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 5 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. An automated method for evaluating documentation coverage, comprising:

from a testing tool having exercised an application, identifying interface elements of the application's user interface;

filtering the identified interface elements to identify documentable interface objects;

for each identified documentable interface object, determining if documentation exists for that documentable interface object and assigning a value to that documentable interface object that is indicative of the determined existence or non-existence of documentation, wherein determining if the documentation exists includes:

ascertaining whether the existence of documentation can be determined from user interface data that at least partially defines the application's user interface as a collection of interface elements;

if so, processing the user interface data to identify associations between the documentable interface objects and those of the interface elements that are indicative of documentation; and if not, mimicking a number of documentation access requests and processing responses to determine the existence of documentation for the documentable interface objects; and reporting documentation coverage data for the application interface, the data being reflective of the values assigned to the documentable interface objects.

2. The method of claim 1, comprising identifying a technology type for the applications and wherein determining comprises, for each identified documentable interface object, determining if documentation exists for that documentable interface object utilizing a technique from a plurality of techniques selected based on the identified technology type.

3. The method of claim 1, comprising:

assembling a hierarchical representation of the interface elements, the representation including parent and child interface elements; and reporting comprises reporting documentation coverage data for each parent interface element that is reflective of the values assigned to the documentable interface objects that are children of that parent interface element.

4. The method of claim 3, wherein:

each parent interface element is an interface element that is indicative of a particular segment of the user interface; and each child interface element of a given parent interface element is an interface element that corresponds to the segment of the user interface indicated by the parent interface element.

5. A memory resource storing instructions that when executed cause a processing resource to implement a system for evaluating documentation coverage for an application, the instructions comprising:

an interface module executable to extract, from user interface data of the application, element data identifying interface elements;

a filter module executable to identify object data from the extracted element data, the object data identifying documentable interface objects;

a documentation module executable to process the element data and the object data to ascertain for each of the documentable interface objects whether the existence of documentation can be determined from associations between the documentable interface objects and those of the identified interface elements that are indicative of documentation;

if so, processing the user interface data to identify associations between the documentable interface objects and those of the interface elements that are indicative of documentation; and if not, mimicking a number of documentation access requests and processing responses to determine the existence of documentation for the documentable interface objects; and a communication module executable to report coverage data representative of the ascertained associations.

6. The memory resource of claim 5, wherein the interface module is configured to identify a technology type for the application and extract, from the interface data, interface elements utilizing a technique selected from a plurality of techniques based on the identified technology type.

7. The memory resource of claim 5, wherein the documentation module is executable to process the element data and the object data to ascertain, for each of the documentable interface objects, if that documentable interface object is associated with an identified interface element that is a tooltip.

8. The memory resource of claim 5, wherein:
the documentation module is executable to distinguish those of the documentable interface objects that are associated with an identified interface element indicative of documentation; and
the communication module is executable to report by:
assigning a value to each of the documentable interface objects each value reflecting whether that documentable interface object has been distinguished; and
reporting coverage data that is indicative of the values assigned to the documentable interface objects.

9. The memory resource of claim 8, wherein:
the interface module is executable to extract element data that includes a hierarchical representation of the interface elements, the representation including parent and child interface elements; and
the communication module is executable to report coverage data for each parent interface element that is reflective of the values assigned to the documentable interface objects that are children of that parent interface element.

10. A system for evaluating documentation coverage, the system comprising:
a filter engine configured to process a configurable rule set to identify documentable interface objects from element data, the element data identifying interface elements of an application's user interface;
a documentation engine configured to process the element data to ascertain for each of the documentable interface objects whether the existence of documentation can be determined from associations between the documentable interface objects and interface elements that are indicative of documentation;
if so, identify associations between the documentable interface objects and those of the interface elements that are indicative of documentation; and
if not, mimicking a number of documentation access requests and processing responses to determine the existence of documentation for the documentable interface objects; and
a communication engine configured to report coverage data representative of the ascertained associations.

11. The system of claim 10, comprising an interface engine configured to identify a technology type of the application and to utilize a one of a plurality of techniques, selected according to the identified technology type, to extract the element data, wherein:
a first of the plurality of techniques includes extracting the element data from user interface data of the application; and
a second of the plurality of techniques includes mimicking a document access request and processing a response.

12. The system of claim 10, wherein the documentation engine is executable to process the element data to ascertain, for each of the documentable interface objects, if that documentable interface object is associated with an interface element that is a tooltip.

13. The system of claim 10, wherein:
the documentation engine is configured to distinguish those of the documentable interface objects that are associated with an identified interface element indicative of documentation; and
the communication engine is configured to report by:
assigning a value to each of the documentable interface objects each value reflecting whether that documentable interface object has been distinguished; and
reporting coverage data that is indicative of the values assigned to the documentable interface objects.

14. The system of claim 13, wherein:
the element data includes a hierarchical representation of the interface elements, the representation including parent and child interface elements; and
the communication engine is configured to report coverage data for each parent interface element that is reflective of the values assigned to the documentable interface objects that are children of that parent interface element.

* * * * *